UNITED STATES PATENT OFFICE.

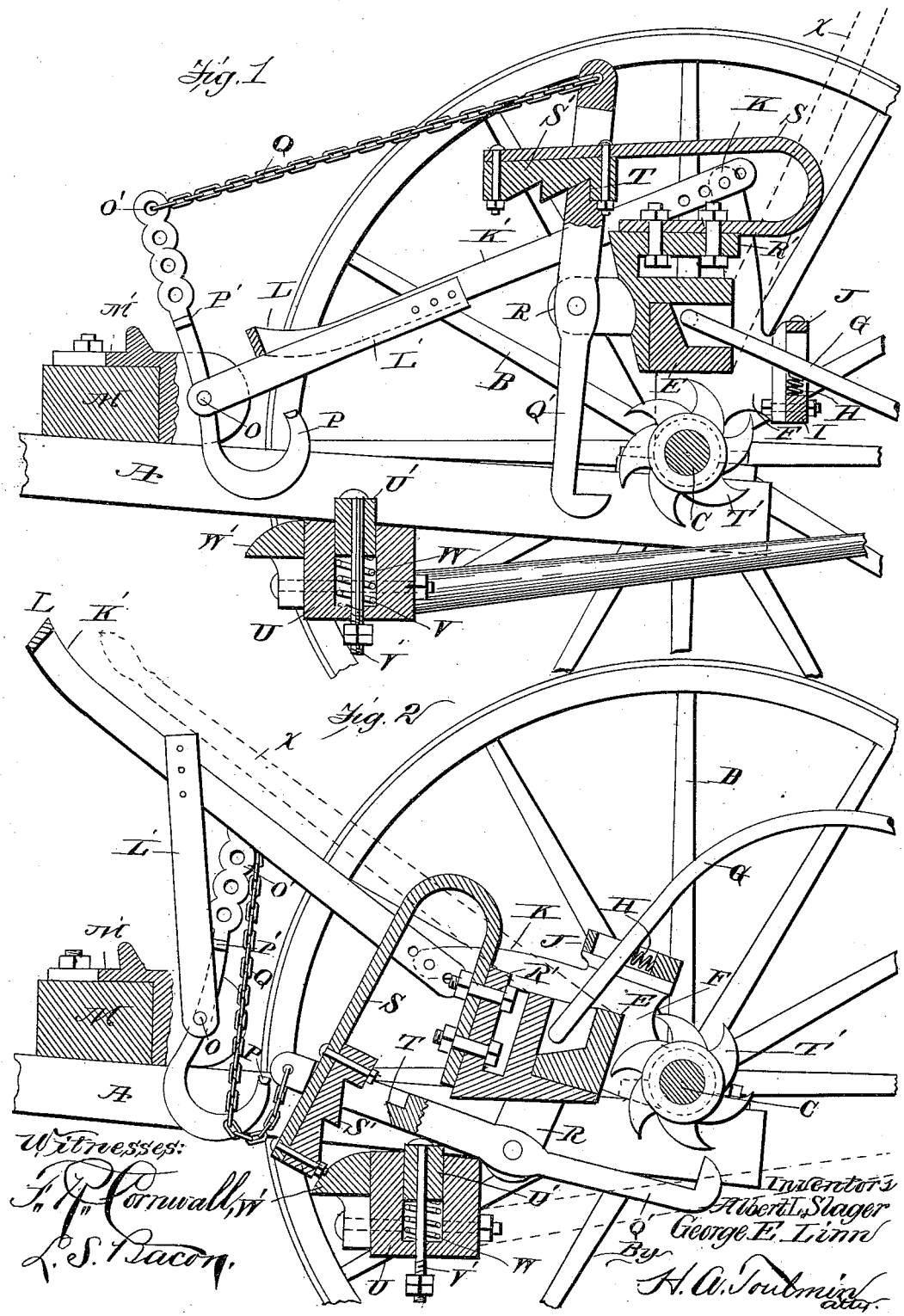

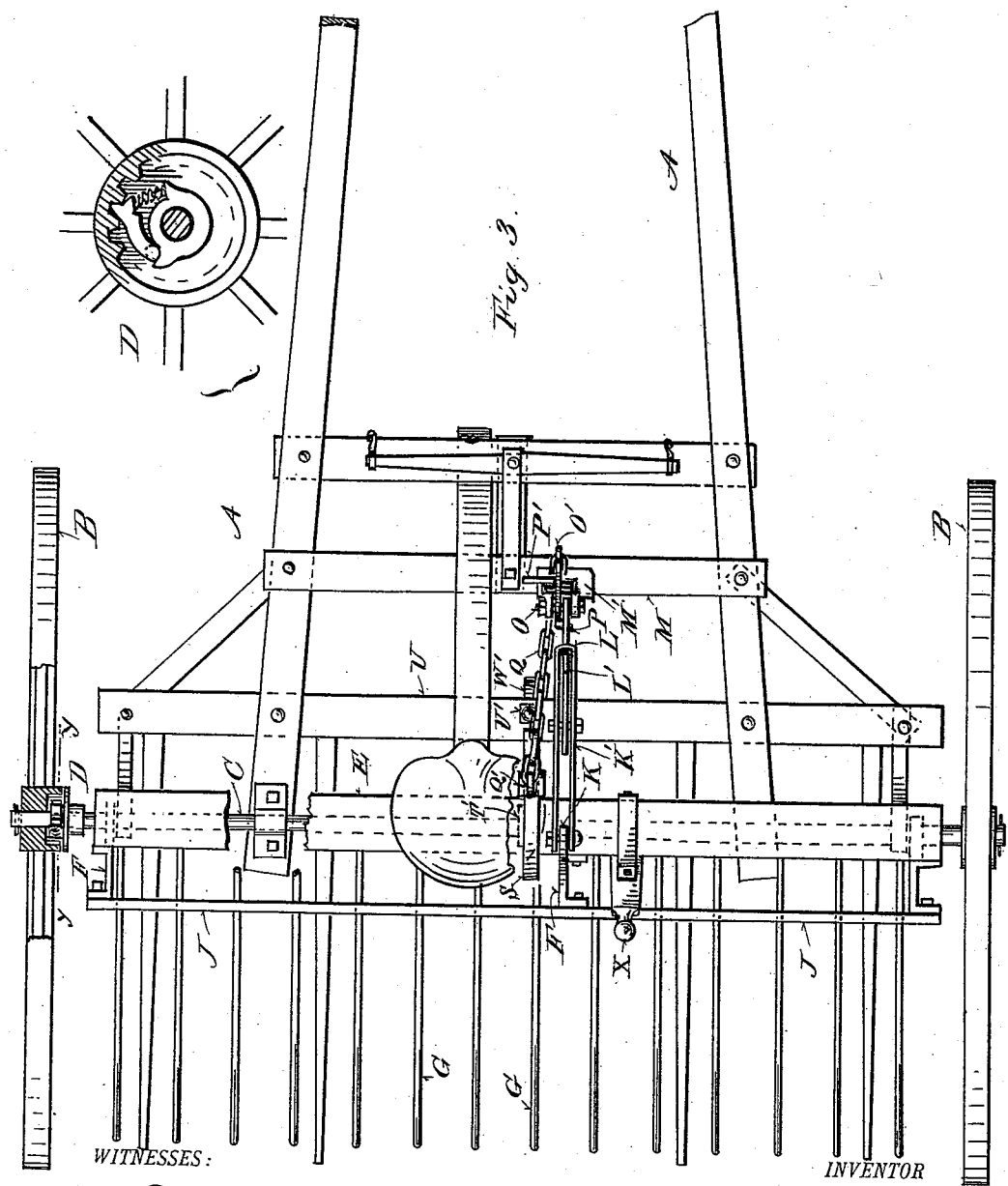

ALBERT L. SLAGER AND GEORGE E. LINN, OF SPRINGFIELD, OHIO, ASSIGNORS TO THE G. S. FOOS COMPANY, OF SAME PLACE.

HAY-RAKE.

SPECIFICATION forming part of Letters Patent No. 446,157, dated February 10, 1891.

Application filed August 23, 1890. Serial No. 362,890. (No model.)

*To all whom it may concern:*

Be it known that we, ALBERT L. SLAGER and GEORGE E. LINN, citizens of the United States, residing at Springfield, in the county of Clark and State of Ohio, have invented certain new and useful Improvements in Hay-Rakes, of which the following is a specification, reference being had therein to the accompanying drawings.

This invention relates to certain new and useful improvements in horse hay-rakes, the peculiarities of which will be hereinafter described and claimed.

In the accompanying drawings, forming a part of this specification and on which like reference-letters indicate corresponding parts, Figure 1 represents a vertical sectional view of a rake-head and axle, showing my improvements partly in elevation and partly in section, with the hand-lever in dotted lines; Fig. 2, a similar view to Fig. 1, with the parts in a dumped position; and Fig. 3, a plan view of a part of the rake embodying my improvements and a sectional view on $y\ y$ of same figure, showing the clutch in elevation.

The letter A designates so much of a thill-frame of a horse hay-rake as is deemed necessary to illustrate in exemplifying our invention, the letter B any approved type of wheels, and the letter C the usual axle, between which and the wheels is provided the usual or any approved type of clutch mechanism, as shown at D. The rake-head E is mounted above the axle upon plates F, fitted to the axle and adapting the rake-head to be moved about the axle in the arc of a circle, or from the position shown in Fig. 1 to that shown in Fig. 2. The head E carries tines G, yieldingly supported by a spring H, carried by a cross-beam I and held down by a cross-bar J.

Suitable instrumentalities are to be provided for locking the rake-head in operative position, as that shown in Fig. 1. Various forms of construction may be employed for this purpose, but we have illustrated the preferred form. One of the plates F has an arm K, to which is pivoted a double bar K', whose forward end is curved slightly upward and forms a stop by the cross-piece L. Within or between this double bar is pivoted a link L' at one end, the other end being pivoted to a cross-beam M of the thill-frame by a bracket M' and a bolt O. The stop L rests upon the upper side of the link L', and the relative position of the three pivots is such that the line of strain caused by the tendency of the teeth to raise passes above the intermediate pivot, whereby the tendency is to force the stop L down upon the link L'. If this tendency is overcome and the intermediate pivot raised above a line drawn between the outer pivots, then the rake-head will be free to swing forward about the axle. A foot-lever O' is also mounted upon the bolt O and provided at one end with a shank P, adapted to engage the under side of the link L' and raise it for the purpose just described. This lever is provided with a foot-piece P', and is connected through one or more of a series of holes by a chain Q or other suitable connection with the upper end of a pawl Q'. This pawl is pivotally mounted upon the rake-head, preferably by means of an intermediate bracket R, which is secured to the rake-head by bolts or otherwise. A projection R' of the bracket carries a spring-detent consisting of a spring proper S, having an irregular surface or tooth S' preferably formed on a plate secured by rivets or otherwise to the spring proper.

The pawl Q' has a shoulder T, with which the teeth of the detent engage to hold the pawl in a proper position to keep it from engaging with a ratchet-wheel T', carried by the axle C, or to hold it in such engagement.

It is preferred, although it is not necessary, to provide a spring-stop, against which the pawl Q' shall strike when the rake-head reaches the limit of its sweep in the operation of dumping. The function of the spring feature of the stop is to give the pawl Q' a movement on its pivot to more quickly and more effectually disengage it from the ratchet-wheel T' on the axle C. A suitable stop of this character is shown mounted upon the cross-beam U, and consists of a block U', fitted to work up and down in an opening V and connected by a stem V' and actuated by a spring W. This spring-stop may be omitted and the pawl allowed to strike against a fixed part of the machine; but, as above stated, the spring-stop is preferred.

In order to disengage the detent S from the shoulder of the pawl Q', so that the pawl may be free to turn on its pivot, an inclined lug W' is secured to the beam U and arranged to be engaged with the descending free end of the detent as it moves downward with the rake-head, whereby the detent-tooth is elevated out of engagement with the pawl and the pawl left free to be turned on its pivot by the stop to disengage the pawl from the ratchet-wheel, so that the weight of the tines may throw the rake-head back to operative position.

The hand-lever X is secured to the rake-head as a means of manipulating it by hand, should it be preferred under some conditions to not use the self-dump and the mechanism here described. The operation of our invention will be fully understood from the foregoing in connection with the statement that the axle is revolved by the wheels through suitable clutch mechanism, and that the point of attachment of the pawl Q' with the rake-head being forward of the center of the axle an engagement of the pawl with the ratchet-wheel T' will draw upon the rake-head and throw it forward and downward; that as the free end of the detent engages with the lug W' it is disengaged from the pawl, and that the stop will by this time act upon the pawl, whether the stop be fixed or yielding, and disengage the pawl from the ratchet-wheel. Before these operations can take place, however, the locking mechanism must be so actuated as to unlock the rake-head. We have heretofore described the mechanism for this purpose. It will be observed that the foot-lever which breaks the lock also throws the pawl into engagement with the ratchet-wheel, so that as the rake-head becomes unlocked from a fixed position it becomes engaged with the revolving axle.

It is of especial advantage and importance to so time the operation of unlocking the rake-head with that of engaging the rake-head with the revolving axle that the latter engagement cannot occur prior to breaking the lock, as otherwise breakage of the machine would result.

Referring again to the bracket M', it consists, simply, of an angular casting adapted to fit on the beam M and having a rear extension or lugs, to which the lever P' is pivoted on the bolt O. The rib shown on the top of the bracket, Fig. 2, may or may not be present, being a mere strengthening-rib.

Having thus fully described our invention, what we claim as new, and desire to secure by Letters Patent, is—

1. In a hay-rake, the combination, with a revoluble axle, a ratchet carried thereby, and a rake-head pivotally connected with the axle, of a thill-frame connected with the axle, locking devices consisting of a link and a locking-bar pivoted together and to the thill-frame and the rake-head, respectively, a pawl and detent carried by the rake-head, the detent engaging with the pawl continuously, except at the end of the forward throw of the rake-head, a foot-lever adapted to unlock the locking devices and connected with the pawl for securing simultaneous action, and devices to arrest the pawl and to throw the detent out of engagement with it.

2. In a hay-rake, the combination, with the axle, the rake-head, and locking devices to lock the head in operative position, of a pivoted pawl carried by the head, a detent engaging with the pawl, a ratchet carried by the axle and adapted to be engaged by the pawl, a tripping device adapted to unlock the locking devices and connected with said pawl, a stop for the pawl, and a device to throw the detent out of engagement with the pawl.

3. In a hay-rake, the combination, with a revoluble axle, of a rake-head supported thereby, a ratchet-wheel on the axle, a pawl pivotally mounted upon the rake-head at the forward side thereof and having a slot with a shoulder, and a spring-detent secured to the rake-head projected through said slot and having teeth to engage with the pawl and adapted to hold it in and out of engagement with the ratchet.

4. In a rake, the combination, with a revoluble axle, of a ratchet-wheel and rake-head carried thereby, a pawl carried by the rake-head, a detent adapted to hold the pawl in and out of engagement with the ratchet-wheel, suitable devices to arrest the pawl and to throw the detent out of engagement therewith, a tripping device to throw the pawl into engagement with the ratchet-wheel, and a lock to lock the rake-head in operative position.

5. In a hay-rake, the combination, with a revoluble axle, of a ratchet-wheel, a rake-head, a pawl pivoted to the rake-head and having a shoulder, a spring-detent carried by the rake-head and having teeth to engage said shoulder to hold the pawl in and out of engagement with the ratchet-wheel, devices to arrest the pawl and throw the detent out of engagement therewith, a foot-lever connected to the pawl, and a lock for the rake-head adapted to be operated by the foot-lever.

6. In a rake, the combination, with the rake-head carrying a pivoted pawl, of a stop for such pawl, a spring to actuate the stop against the pawl, a spring-detent engaging with the pawl, and a curved surface adapted to throw the detent out of engagement with the pawl.

In testimony whereof we affix our signatures in presence of two witnesses.

ALBERT L. SLAGER.
GEORGE E. LINN.

Witnesses:
WARREN HULL,
GEO. A. BEARD.